(12) United States Patent
Wheeler (10) Patent No.: US 10,140,592 B2
(45) Date of Patent: Nov. 27, 2018

(54) PROVIDING FEEDBACK-BASED RATE ADJUSTMENT FOR ELECTRONIC COMMUNICATION SERVICES

(71) Applicant: Amazon Technologies, Inc., Seattle, WA (US)

(72) Inventor: Chris Wheeler, Sebastopol, CA (US)

(73) Assignee: Amazon Technologies, Inc., Seattle, WA (US)

( * ) Notice: Subject to any disclaimer, the term of this patent is extended or adjusted under 35 U.S.C. 154(b) by 219 days.

(21) Appl. No.: 14/992,559

(22) Filed: Jan. 11, 2016

(65) Prior Publication Data

US 2016/0125420 A1  May 5, 2016

Related U.S. Application Data (63) Continuation of application No. 12/966,602, filed on Dec. 13, 2010, now Pat. No. 9,262,751.

(51) Int. Cl.
| | |
|---|---|
| *G06Q 10/10* | (2012.01) |
| *H04L 29/06* | (2006.01) |
| *H04L 12/58* | (2006.01) |
| *G06Q 30/00* | (2012.01) |

(52) U.S. Cl.
CPC ......... *G06Q 10/107* (2013.01); *G06Q 30/016* (2013.01); *H04L 51/16* (2013.01); *H04L 63/12* (2013.01); *H04L 63/123* (2013.01); *H04L 63/126* (2013.01)

(58) Field of Classification Search
CPC ............................ G06Q 10/107; H04L 63/123
USPC .................................................. 709/206, 204
See application file for complete search history.

(56) References Cited

U.S. PATENT DOCUMENTS

| | | | | |
|---|---|---|---|---|
| 7,293,065 | B2 * | 11/2007 | Banister | G06Q 10/107 709/206 |
| 2009/0024605 | A1 * | 1/2009 | Yang | G06F 17/30867 |
| 2010/0042471 | A1 * | 2/2010 | Chang | G06Q 10/107 705/14.16 |

* cited by examiner

*Primary Examiner* — Emmanuel L Moise
*Assistant Examiner* — Xiang Yu
(74) *Attorney, Agent, or Firm* — Thomas | Horstemeyer, LLP (57) ABSTRACT

Various embodiments directed to the calculation, assessment, and adjustment of costs assessed to senders of unwanted messages, such as email messages, are described. In one embodiment, feedback data associated with emails transmitted on behalf of a sender is received, and complaint data associated with the sender is updated based on the feedback data. Further, one or more complaint thresholds for one or more time intervals are determined. The complaint thresholds can be determined based on a volume of messages sent by the sender over one or more time periods, for example, or other factors. A cost is assessed to the sender in response to a comparison of the complaint data to one or more of the complaint thresholds. Additionally or alternatively, costs to the sender can be adjusted in response to the comparison of the complaint data to the complaint thresholds.

18 Claims, 8 Drawing Sheets

PROVIDING FEEDBACK-BASED RATE ADJUSTMENT FOR ELECTRONIC COMMUNICATION SERVICES

CROSS-REFERENCE TO RELATED APPLICATIONS

This application is a continuation of U.S. patent application Ser. No. 12/966,602, titled "Providing Feedback-Based Rate Adjustment for Electronic Communication Services," filed Dec. 13, 2010, the entire disclosure of which is hereby fully incorporated herein by reference.

BACKGROUND

Electronic communications have become widely accepted for communicating among people and/or groups of people. One such example of widely accepted communications includes electronic mail also referred to as email. Early versions of email were designed to be technologically flexible so that anyone could transmit a message to anyone else. In this regard, there was an implied trust between a sender and a recipient. As email usage increased into a mass communication medium, a lack of controls corresponding to the technological flexibility and the implied trust has been exploited by groups and individuals to send unwanted email messages (spam) to large groups of people. Email receipt providers and/or Internet Service Providers (ISPs) have responded by trying to identify spam senders and blocking future content from such senders. For example, email receipt providers and/or ISPs may include applications for a recipient to identify spam. Unfortunately, such identifications may also have unintended punitive affects on legitimate senders.

DETAILED DESCRIPTION

Various embodiments described herein utilize feedback loop data corresponding to unwanted messages to incentivize message senders to modify their sending habits. For example, one or more complaint thresholds that correspond to unacceptable levels of unwanted message transmission may be established. A complaint threshold may be dynamic and may correspond to a total volume of messages sent during a given time interval. Depending on comparisons between the number of unwanted messages and the complaint thresholds, the cost of sending the messages that is charged to the sender may be modified.

More specifically, a message service, such as an email service provider, may receive multiple messages from a sender to be sent to multiple recipients. Some embodiments provide that, for each message, the message service may generate an encoded key and/or link in the header, body and/or content of the message that is specifically mapped to an email message, sender and/or recipient. The messages may then be sent to other email providers such as Internet Service Providers (ISP's) and/or Email Receipt Providers (ERP's), among others. The service/receipt providers may subject the received messages to a series of filters prior to delivering the messages to the recipient's inbox. If the recipient determines that the message is an unwanted message, a "Spam" button and/or link provided by the service/receipt provider may be executed and/or actuated by the recipient. In this manner, the message is reported as an unwanted message at the point of delivery.

In response to a report of an unwanted message by a recipient, a service/receipt provider may store the message in an unwanted message folder such as, for example, a spam folder and collect the information associated with the unwanted message. After redacting portions of the unwanted message to remove privacy protected information, the redacted message may be asynchronously transmitted back to the message service to provide a feedback loop. The redacted message may be transmitted in the form of an abuse report format (ARF) message. In an effort to reduce the quantities of unwanted messages, the service/receipt providers may define a threshold amount of unwanted messages sent from any one message service or sender, which may be identified by an Internet Protocol (IP) address. Once a message service, sender and/or IP address exceeds the unwanted message threshold, the service provider may refuse to receive any additional messages from that message service, sender and/or IP address.

As described herein, once feedback loop data is received, the message service may use the encoded key and/or link to identify the sender. The complaint associated with the unwanted message is attributed to an account that is associated with the sender. A complaint value corresponding to the number of complaints received during a given time interval may be incremented responsive to receiving the complaint. In some embodiments, the given time interval may be predetermined, predefined and/or dynamically defined responsive to the specific circumstances. If the number of complaints exceeds a threshold number of complaints during that time interval, then an additional cost may be assessed to the sender. The sender may be a subscriber to a network and/or to a network access service. In this regard, a cost may include an amount to be paid by the subscriber for being provided network access. For example, a sender may pay a message service for sending emails. In response to excessive complaints, the message service may require the sender to pay an additional cost to continue to use the message service for sending emails. In some embodiments, the message service may temporarily suspend and/or permanently close the sender's account.

The threshold may be dynamically adjusted and may vary according to the total volume of messages the message service is sending on behalf of the sender. For example, the threshold may be a certain percentage of the total volume of emails sent by the message service on behalf of the sender. In the instance where the message service sends relatively few or a low number of messages for the sender during a given time period, the threshold may be a relatively high percentage of the total, such as, for example, twenty percent of the total volume sent. Similarly, if the total number of messages sent for the sender in a given time period is high, the threshold may be a low percentage, such as, for example, one percent of the total volume sent. A variable threshold may also be implemented using, for example, a moving average or a weighted moving average. In this manner, a sender that experiences an atypically high complaint rate in a given time period may not be penalized at that moment. In some embodiments, multiple thresholds may be established, each triggering different levels of cost modification.

Some embodiments provide that the cost modification corresponding to unwanted messages may be implemented as a credit and/or discount. For example, if a user maintains an overall low complaint rate for a sustained period of time and/or is associated with a low complaint rate for a significant number of consecutive time intervals, a good sender discount may be applied to the sender's cost. In this manner the sender's cost for sending emails may be reduced.

Although discussed above in terms of a complaint that is reported to the service provider through a spam button or report, the message service may insert a direct link in the message before sending it to the service provider. The direct link, when executed and/or actuated by the recipient, may cause a complaint to be sent directly to the message service, bypassing the service provider. In this manner, the message service may address the unwanted message sender activities without having a complaint against them logged by the service provider. Accordingly, feedback loop data may be used, at least in part, to incentivize senders not to send unwanted messages.

Overall Architecture

Figure 1:
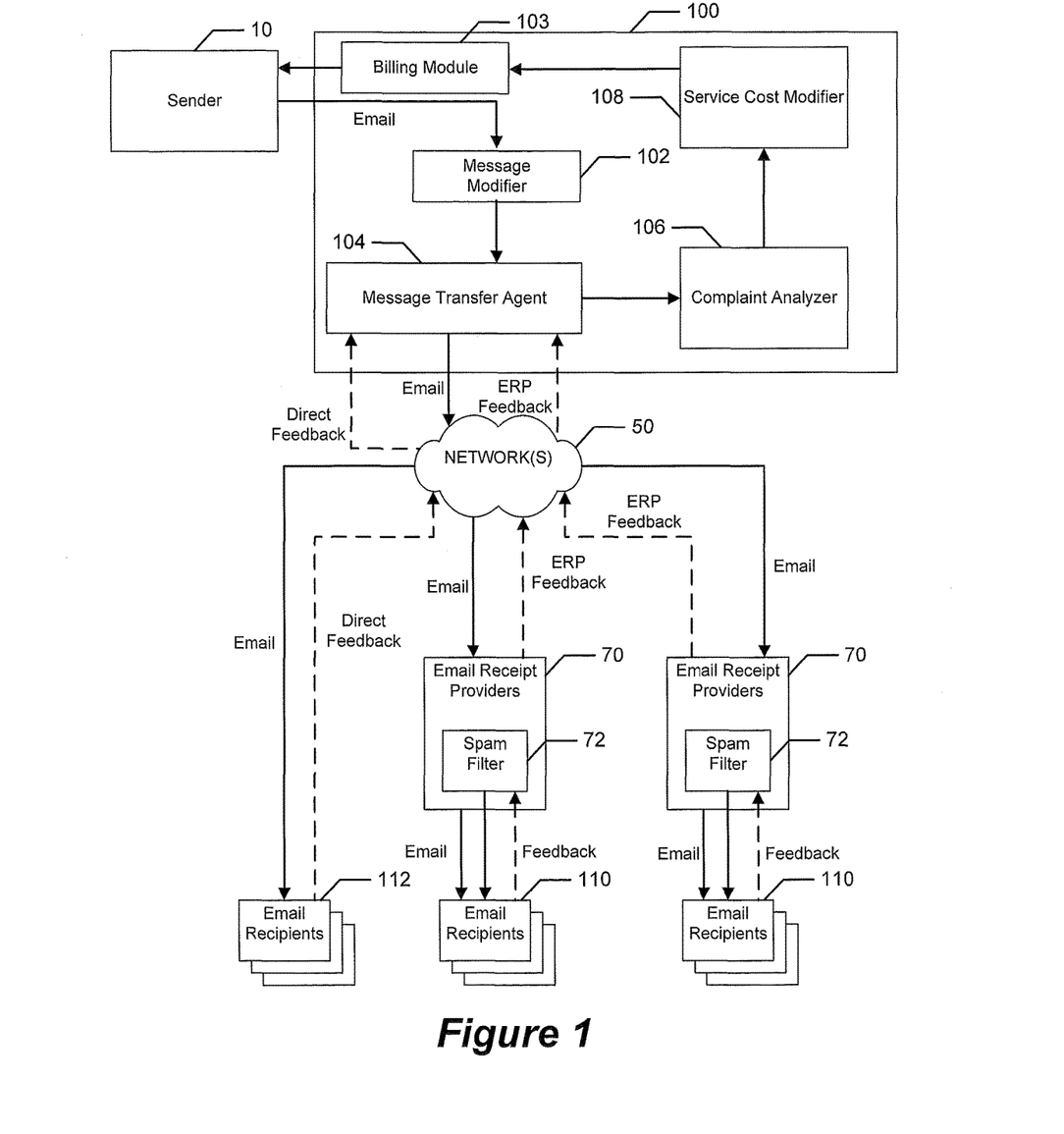
FIG. 1 is a block diagram of systems, devices, methods and computer program products for incentivizing email senders regarding email content, according to various embodiments described herein.

Reference is now made to FIG. 1, which is a block diagram of systems, devices, methods and computer program products for incentivizing email senders regarding email content, according to various embodiments described herein. As described herein, a message service may include a sender email service provider 100 that may receive multiple emails from a sender 10 for delivery to multiple email recipients 110, 112. As used herein, a sender 10 may include an individual, group, organization and/or device associated therewith that sends, submits and/or provides to be sent one or more electronic communications designated for delivery to one or more recipients. Some embodiments provide that the emails are intended for delivery to email recipients 110 that use email receipt providers 70. Examples of well-known email receipt providers 70 may be web-based and/or enterprise solutions including, but are not limited to, Microsoft Exchange®, Hotmail®, Google®, Yahoo® and AOL®, among others. In some embodiments, the email recipients 112 use the email service provider 100 for providing delivery of emails.

Whether directly delivered by the sender email service provider 100 or delivered via the email receipt providers 70, the emails may be routed through one or more packet and/or circuit switched networks 50 including the Internet, local area networks (LANs), wide area networks (WANs), and/or the public switched telephone network (PSTN), among others.

In some embodiments, an email received by the sender email service provider 100 may be modified by a message modifier 102 to include additional content that may correspond to a sender identity and/or a recipient identity, among others. Some embodiments provide that such modification may be included in some, all or none of the emails received by the sender email service provider 100. For example, some embodiments provide that each message may be supplemented with an encoded key value. The encoded key value may be generated as an identifier corresponding to the identities of the sender and recipient. Some embodiments provide that the identifier may be unique to the sender and recipient corresponding to a given message. In some embodiments, messages may be supplemented with a feedback link in the body of the email message that may be executed by a recipient if the email message is unwanted and may cause feedback data to be sent back to the sender email service provider 100. Although not illustrated, upon receipt of a message from a sender 10, one or more analysis tools may be used to verify that the message is acceptable in format.

A message transfer agent (MTA) 104 may initiate a communication with an MTA (not shown herein) of an email receipt provider 70 to negotiate sending the modified email message. Although not illustrated, metrics may be collected regarding the sender and recipients so that an account corresponding to the sender 10 may be charged accordingly. Once the email message is delivered to the MTA of the email receipt provider 70, multiple evaluations of the email message may be performed. For example, if the email message originates from an IP address that has been blacklisted, the email receipt provider 70 may refuse to accept the email message. Depending on the sophistication of the email receipt provider 70, a series of filters may be applied to analyze the message header, sender reputation, authentication and/or a content filter, among others. Responsive to the results of the analyses, the email message may be stored in the recipient's spam filter 72 or stored in the email recipient's 110 inbox.

In the case of an unwanted email message, a recipient may identify the email message accordingly using, for example, a "spam button" (not shown) that may be provided by the email receipt provider 70. In response, the email receipt provider 70 may store the unwanted email message to a spam folder or other area partitioned from the recipient's inbox. Additionally, the email receipt provider 70 may collect information corresponding to the unwanted email message, redact any privacy related information from the message, and asynchronously send the redacted email message back to the sender email service provider 100. By sending the redacted message back to the sender email service provider 100, a feedback loop is provided to give the sender email service provider 100 an opportunity to regulate unwanted messages.

The MTA 104 receives the redacted email message and uses the identifier embedded therein to determine the identity of the sender 10. Once the sender 10 is identified, an account associated with the sender is attributed a complaint corresponding to the unwanted email message. A complaint quantity value may be incremented corresponding to an attributed complaint. In some embodiments, the complaint rate may be determined as a function of the volume of email messages that the sender 10 has sent during a given time interval. Some embodiments provide that the given time interval may be predetermined and/or determined as needed.

By way of example, an "X" hour window may be examined to determine a complaint rate as the percentage of email messages that were sent that resulted in complaints. According to embodiments herein, the value of X may be an integer and/or a rational value that could range from 1 hour or less up to hundreds of hours or more. Depending on the amount of email messages sent by the sender, the time interval may have a minimum reasonable value to provide statistically significant results. Similarly, as the time interval increases, the responsiveness of the feedback system may be reduced, especially for high volume senders. In some embodiments, a 12 hour time interval may be used, while other embodiments may use 6, 18 and/or 24 hour time intervals. Additionally, X may vary according to time of day, day of the week or month, and/or other factors.

The complaint rate may be compared to a complaint threshold via a complaint analyzer (block 106). In some embodiments, the complaint threshold may be determined as a function of the sending volume. For example, a sent volume of thousands or more legitimate emails may be able to easily stay below a one percent complaint rate, a sent volume of less that twenty emails would exceed a one percent threshold based on a single complaint. In this regard, the complaint threshold may be dynamically adjusted as the volume of email messages sent increases. In some embodiments, multiple levels of complaint thresholds may be determined.

If the quantity or complaint rate of unwanted email messages exceeds the complaint threshold, then a service cost adjustment may be assessed via a service cost modifier (block 108). In some embodiments, the service cost adjustment may be an additional cost that is assessed to the sender 10. For example, a per-unwanted message fee may be charged once the quantity of unwanted email messages and/or the complaint rate exceeds the complaint threshold. In some embodiments, a fixed fee may be added to the sender's bill based on exceeding the complaint threshold. As discussed above, the complaint threshold may include multiple complaint thresholds corresponding to different quantities and/or rates of unwanted email messages. In this regard, the additional cost charged to the sender 10 may increase corresponding to higher complaint thresholds that are exceeded. For example, if a highest complaint threshold is exceeded, an additional cost may be disproportionately high relative to the additional costs corresponding to other lower complaint threshold levels.

Additionally and/or alternatively, a service cost adjustment may include a discount and/or a credit corresponding to sustained complaint rates that are below the complaint threshold(s). For example, after a predetermined period of time and/or a predetermined number of consecutive time intervals in which a sender 10 has not exceeded a complaint threshold, a discount and/or credit may be applied to the bill for email services. In this manner, the sender 10 may be incentivized to provide future email content that is less likely to be identified as unwanted or "spam". Additionally, other costs associated with unwanted emails may be recovered, subsidized and/or reduced, such as those associated with bandwidth, processing resources and/or sender reputation, among others. Any cost modification and/or assessed costs may be communicated to a billing module 103 that is configured to generate a bill corresponding to the sender's account.

Use Case Message Flow Examples

Figure 2:
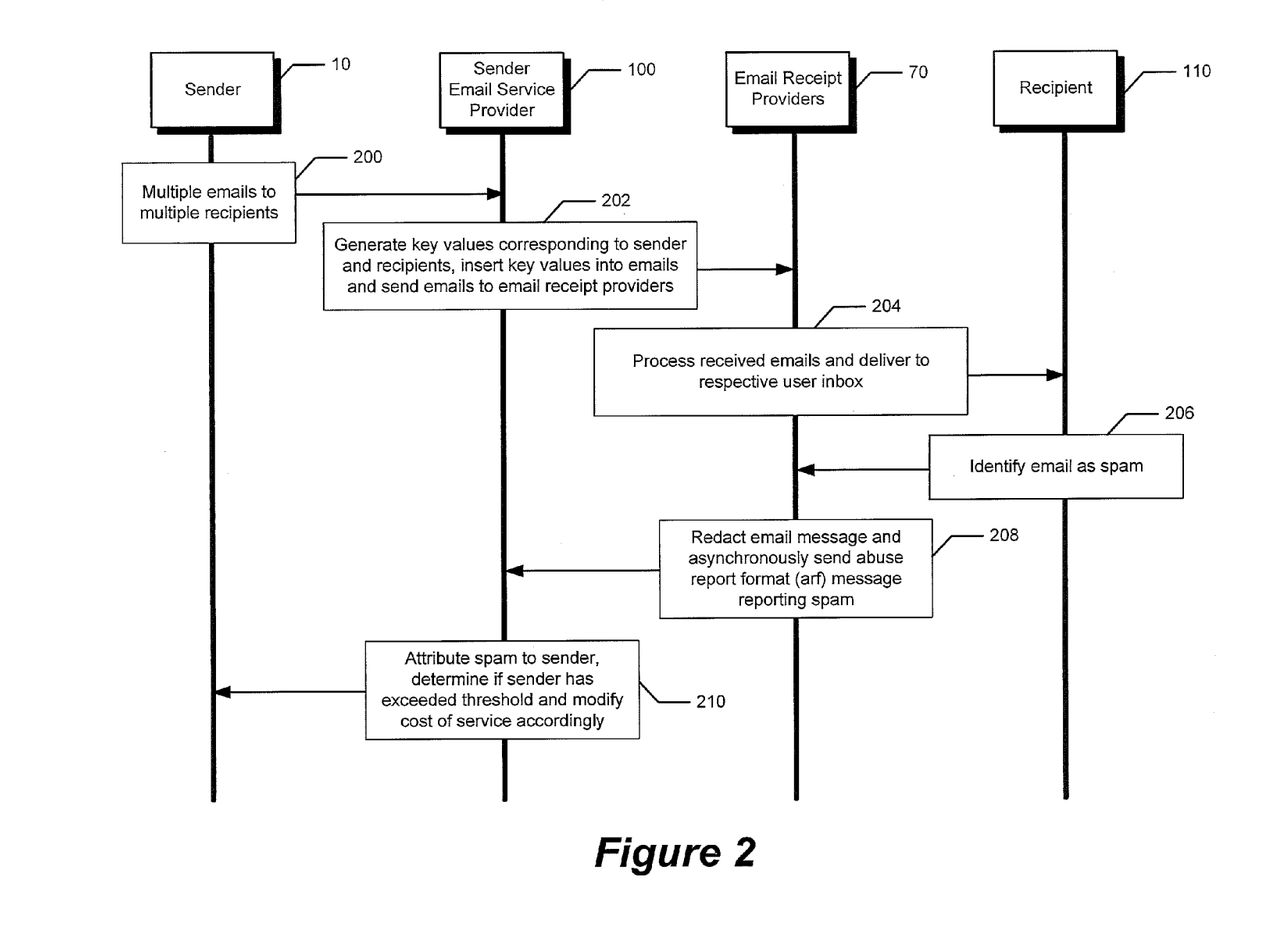
FIG. 2 is a diagram of operations and associated message flows that may be performed by various elements of FIG. 1 to incentivize email senders regarding email content according to some embodiments described herein.

Reference is now made to FIG. 2, which is a diagram of operations and associated message flows that may be performed by various elements of FIG. 1 to incentivize email senders regarding email content according to some embodiments described herein. The sender 10 sends multiple emails for multiple email recipients to the sender email service provider 100 (block 200). The sender email service provider 100 generates encoded key values and/or links corresponding to the sender 10 and/or the recipients 110 (block 202). The key values are inserted into corresponding ones of the emails, which are sent to email receipt providers 70 (block 202). Some embodiments provide that the key values may be inserted into a header field and/or a body of respective emails. In addition to filtering incoming emails, as discussed above regarding FIG. 1, the email receipt providers 70 process the received emails and deliver them to respective user inboxes of the recipients 110 (block 204). Although not illustrated herein, emails that are filtered by the email receipt provider 70 and not delivered to the recipient 110 may be identified as spam and reported to the sender email service provider 100 without action by the recipient 110.

An email that is unwanted by the recipient 110 may be identified as spam (block 206), an indication of which is provided to the email receipt provider 70. The email receipt provider 70 may move the unwanted email message to a spam folder or other designated location for unwanted email messages, redact email message to remove personal and/or privacy related information and synchronously and/or asynchronously send an abuse report format (ARF) message that includes the redacted email message to the sender email service provider 100 (block 208). In response to receiving the redacted email message (feedback loop complaint), the sender email service provider 100 attributes the unwanted message (spam) to the sender, determines if the sender has exceeded a complaint threshold, and, if so, modifies the cost of service responsive thereto (block 210).

Figure 3:
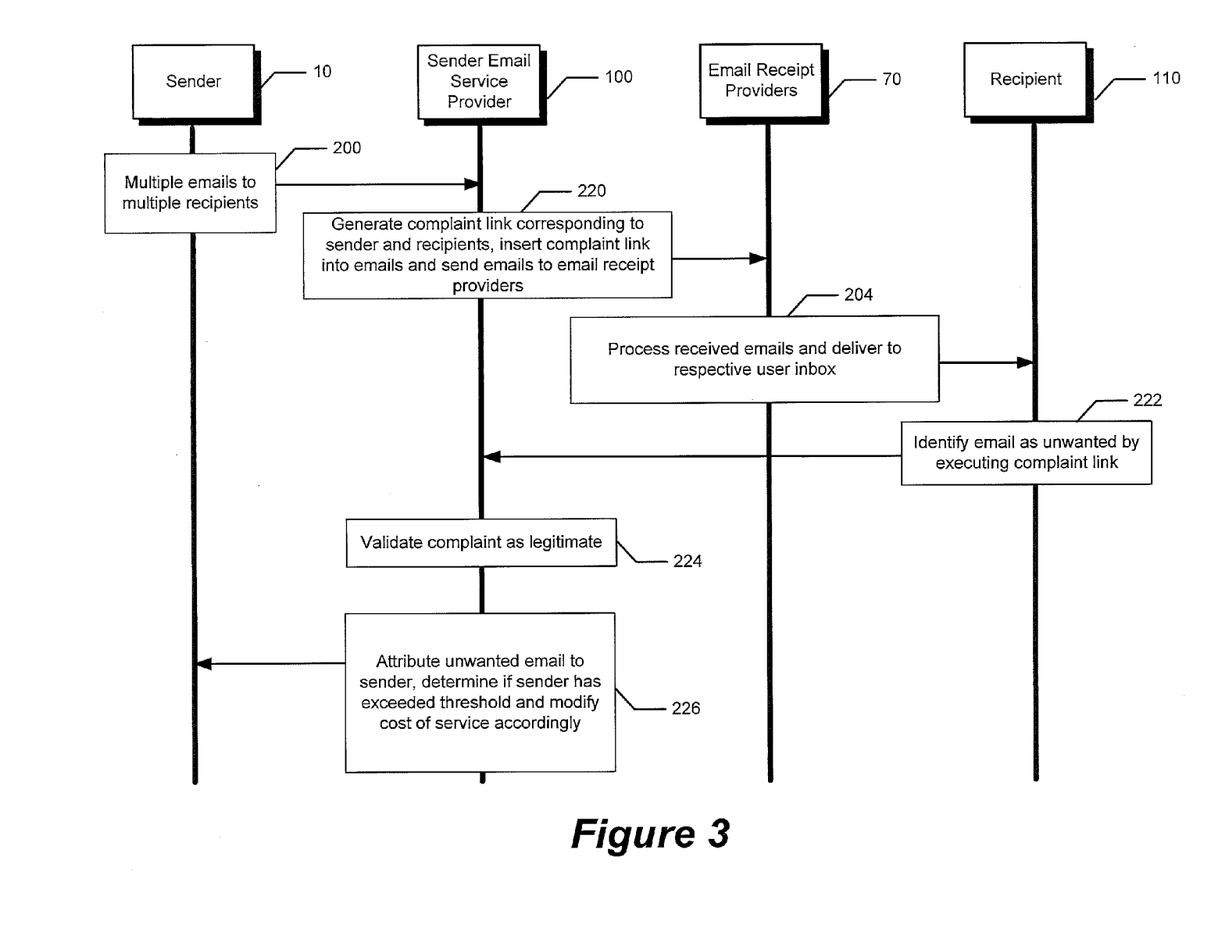
FIG. 3 is a diagram of operations and associated message flows that may be performed by various elements of FIG. 1 to incentivizing email senders regarding email content using a complaint link according to some embodiments described herein.

Reference is now made to FIG. 3, which is a diagram of operations and associated message flows that may be performed by various elements of FIG. 1 to incentivize email senders regarding email content using a sender service provided complaint link according to some embodiments described herein. As discussed above regarding FIG. 2, the sender 10 sends multiple emails for multiple email recipients to the sender email service provider 100 (block 200). The sender email service provider 100 generates complaint links corresponding to the sender 10 and/or the recipients 110 that, when executed and/or actuated, cause a complaint message to be sent to the sender email service provider 100 (block 220). The complaint links are inserted into corresponding ones of the emails, which are sent to email receipt providers 70 (block 220). In addition to filtering incoming emails, as discussed above regarding FIG. 2, the email receipt providers 70 process the received emails and deliver them to respective user inboxes of the recipients 110 (block 204).

An email that is unwanted by the recipient 110 may be identified as spam by executing and/or actuating the included complaint link (block 222). The complaint link may provide a report to the sender email service provider 100 without notifying the email receipt provider 70. In this manner, the unwanted email message may not be counted against the sender email service provider 100 by the email receipt provider 70. Some embodiments provide that in response to receiving the complaint message via the complaint link, the sender email service provider 100 may validate the complaint (block 224). For example, the complaining recipient identity may be compared with identities of the sender's intended recipients to prevent unintended recipients from causing a complaint message to be attributed to the sender. Similarly, the complaint may be compared to other received complaints to ensure that duplicate complaints are not being executed regarding the same recipient. Some embodiments provide that validation may include determining if the complaint is the only complaint. For example, in the circumstance that a recipient mistakenly selects the complaint link, the complaint may not be attributed to the sender email service provider 100. If the complaint is legitimate, the sender email service provider 100 attributes the unwanted message (spam) to the sender, determines if the sender has exceeded a complaint threshold, and, if so, modifies the cost of service responsive thereto (block 226).

Figure 4:
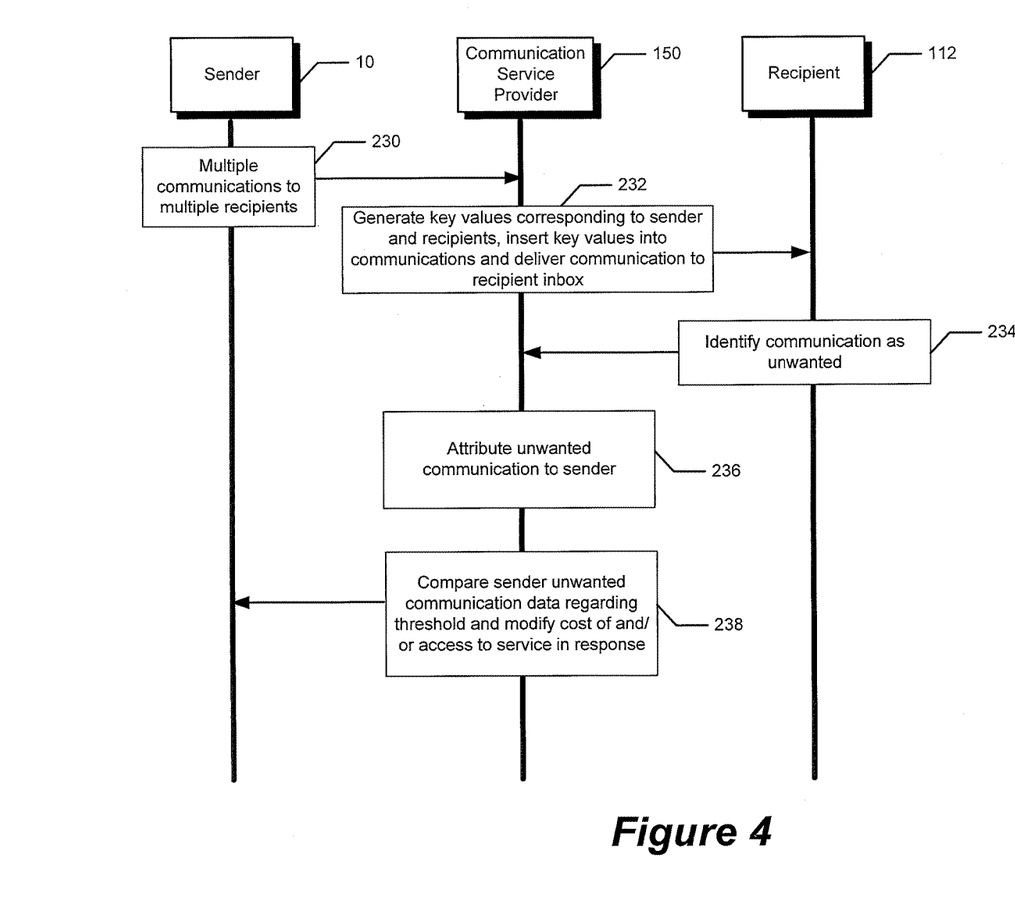
FIG. 4 is a diagram of operations and associated message flows that may be performed by various elements of FIG. 1 to incentivize email senders regarding email content according to some embodiments described herein.

Reference is now made to FIG. 4, which is a diagram of operations and associated message flows that may be performed by various elements of FIG. 1 to incentivize communication senders regarding communication content according to some embodiments described herein. The sender 10 sends multiple communications for multiple recipients to the communication service provider 150 (block 230). As described herein, a communication service provider 150 may include an email service provider as discussed above regarding FIGS. 1-3, but is not so limited. For example, a communication service provider 150 may provide communications including emails, short message service (SMS) messages, online community messages, and/or social network messages, among others. For example, communications may include messages sent through Facebook, Twitter, email, SMS, and/or Yahoo Groups, among others. The communication service provider 150 generates encoded key values and/or links corresponding to the sender 10 and/or the recipients 112 (block 232). The key values and/or links are inserted into corresponding ones of the communications, which are sent to corresponding recipients 112 (block 232).

A communication that is unwanted by the recipient 112 may be identified as such, the indication of which is provided to the communication service provider 150 (block 234). In response to receiving the unwanted communication indication (complaint), the communication service provider 150 attributes the unwanted communication to the sender 10 (block 236). The communication service provider 150 compares the unwanted communication data corresponding to the sender 10 to determines if the sender 10 has exceeded a complaint threshold, and, if so, modifies the cost of service and/or access to one or more services for the sender 10 (block 238). In this manner, a sender 10 may be incentivized not to send unwanted communications.

Complaint Processing Examples

A communication service provider 150 may be operative to assess an additional cost to a sender 10 in response to complaints received about unwanted communications. For example, reference is now made to FIG. 5, which is a flowchart of operations that may be performed to incentivize a sender by assessing a content-related cost regarding unwanted communications according to some embodiments described herein. The operations commence when a communication service provider receives a complaint regarding an unwanted communication that was sent to a recipient (block 302). Some embodiments provide that the complaint may be in the form of a redacted version of the unwanted communication and may be provided by a recipient communication service provider. In this regard, the redacted communication may include an encoded key and/or link that provides information regarding the sender. In some embodiments, the complaint may be received via a link that, when executed and/or actuated, causes a complaint message to be sent to the communication service provider 150. Based on information in the complaint, the sender 10 is identified (block 304). Although not illustrated, some embodiments provide that the complaint may be validated to ensure that it is a legitimate complaint.

Figure 5:
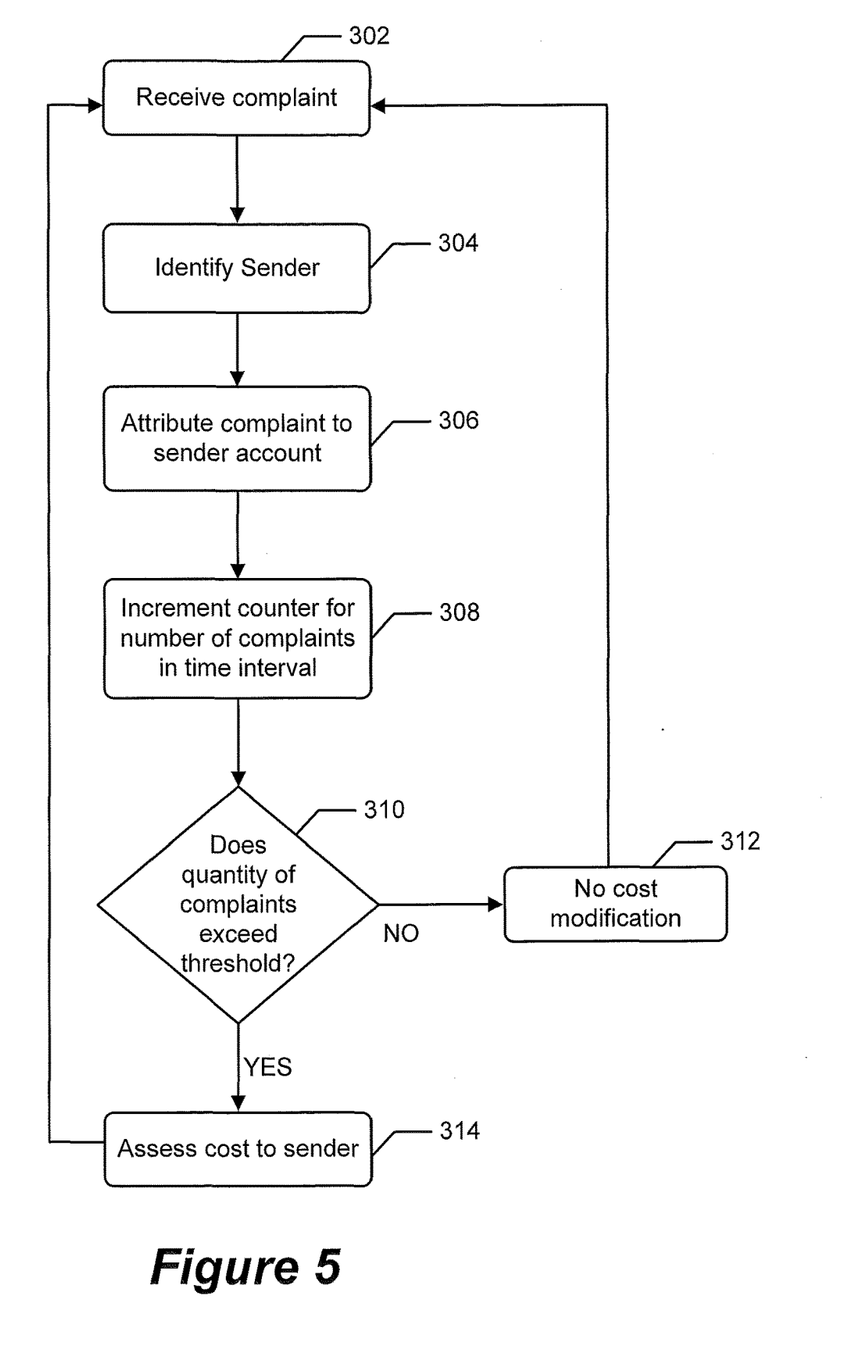
FIG. 5 is a flowchart of operations that may be performed to incentivize a sender by assessing a content-related cost regarding unwanted communications according to some embodiments described herein.

Once the sender is identified, the complaint is attributed to an account that is associated with the sender 10 (block 306). A complaint counter corresponding to the number of complaints during a given time interval may be incremented responsive to the complaint being attributed (block 308). A determination is made as to whether the quantity of complaints exceeds a complaint threshold (block 310). As discussed above, the complaint threshold may include a dynamic complaint threshold that varies according to the volume of sent communications and/or a multi-tier complaint threshold that corresponds to different respective consequences. If the complaint threshold is exceeded, then a cost may be assessed to the sender 10 for sending a greater than an unacceptable quantity and/or rate of unwanted communications (block 314). In the alternative, if the complaint threshold is not exceeded, then there may be no cost modification (block 312). Some embodiments provide that the cost modification need not be assessed immediately and, instead, may be stored and assessed after multiple time intervals, for example, at the end of a billing period.

Some embodiments provide that incentivizing the sender may include assessing additional cost and/or providing a discount or credit to a cost that is charged to the sender 10. For example, reference is now made to FIG. 6, which is a flowchart of operations that may be performed to incentivize a sender by considering historical data regarding unwanted communications according to some embodiments described herein. Operations corresponding to blocks 302, 304, 306, 308 and 310 were discussed above regarding FIG. 5 and thus redundant discussion thereof will be avoided. Starting in the operations at block 310, if the quantity and/or rate of complaints associated with the sender is less than the threshold, then it is determined if the sender 10 has a favorable complaint history (block 322). Some embodiments provide that a favorable complaint history may be determined by a length of time during which the sender 10 has maintained an acceptable quantity and/or rate of complaints. In some embodiments, for example, a complaint history may be established using a moving average including but not limited to a weighted moving average. In this regard, if the sender's weighted moving average has remained below an unacceptable complaint threshold, then the sender may be considered to have a favorable complaint history.

Figure 6:
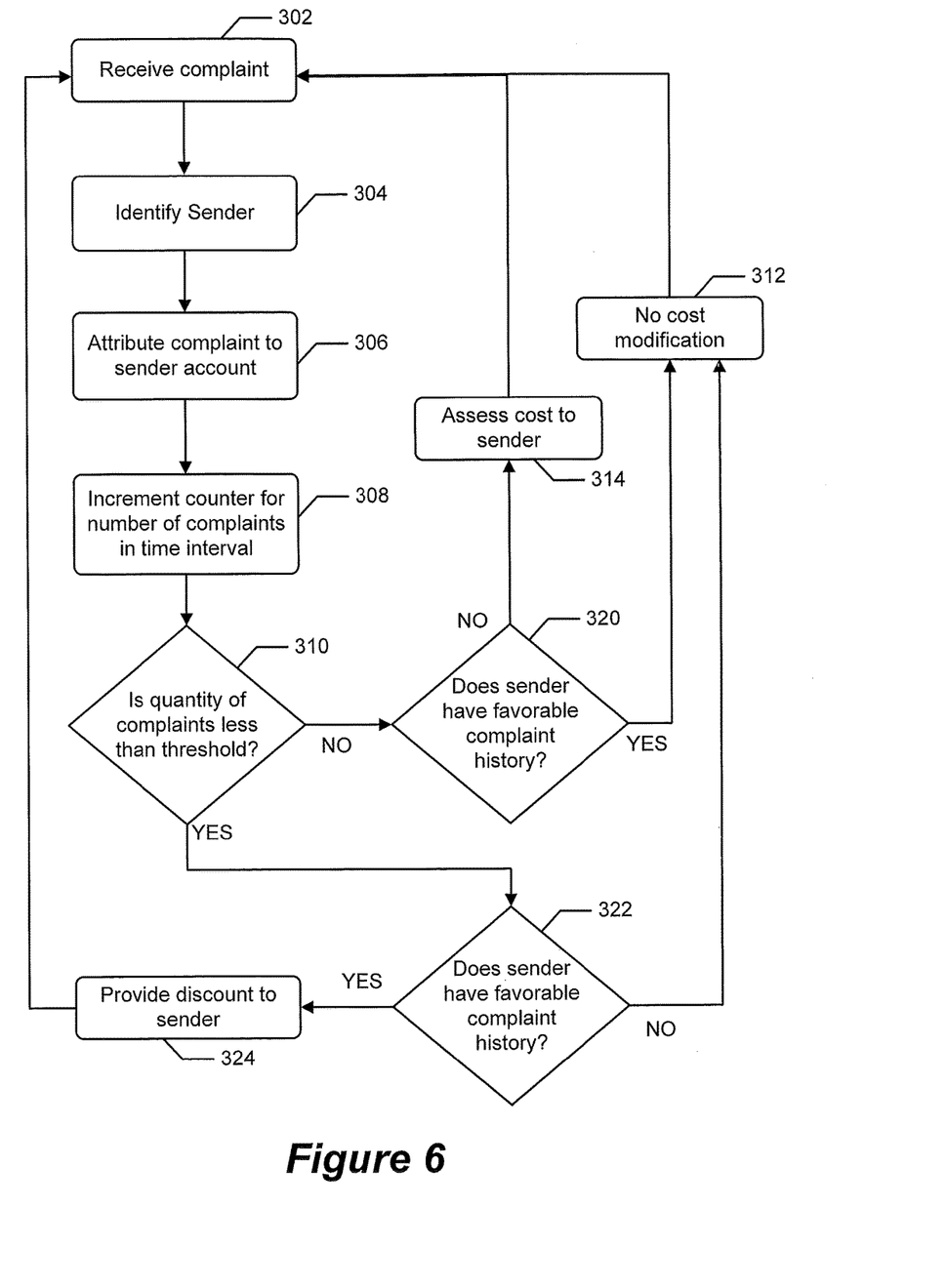
FIG. 6 is a flowchart of operations that may be performed to incentivize a sender by considering historical data regarding unwanted communications according to some embodiments described herein.

If the sender 10 does not have a favorable complaint history and a quantity of complaints less than the threshold then there may be no cost modification (block 312). In the alternative, if the sender 10 has a favorable complaint history and a quantity and/or rate of complaints less than the threshold, then a discount may be provided to the sender (block 324).

If the quantity of complaints is not less than the threshold (block 310) historical data may be determined if the sender 10 is a favorable complaint history (block 320). In this circumstance if the sender 10 has a favorable complaint history but currently has complaints that exceed the threshold, no cost modification may be performed (block 312). If the sender does not have a favorable complaint history and has complaints in excess of the threshold they cost may be assessed to the sender's account (block 314). In this manner, a sender may be incentivized to avoid sending communications that are unwanted.

Multiple Complaint Threshold Example

Figure 7:
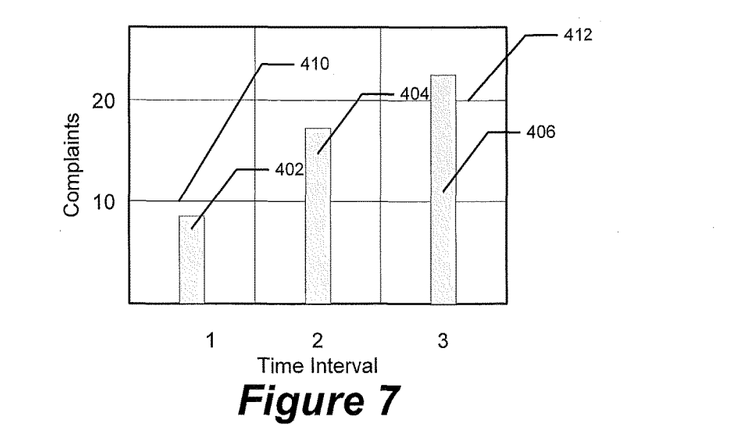
FIG. 7 is a graph illustrating example complaint rates during different time intervals relative to multiple complaint thresholds according to some embodiments described herein.

Reference is now made to FIG. 7, which is a graph illustrating example complaint rates during different time intervals relative to multiple complaint thresholds according to some embodiments described herein. As discussed above regarding FIG. 1, multiple complaint thresholds may be established. For example, a first complaint threshold 410 may correspond to 10 complaints received during a particular time interval. Similarly a second complaint threshold 412 may correspond to 20 complaints received during a particular time interval. As illustrated during time interval number 1, the number of complaints received 402 is less than both the first and second complaint thresholds 410, 412. In this regard, an additional cost may not be assessed to the sender corresponding to complaints received during time interval number 1.

Briefly referring to time interval number 2, the complaints received 404 exceed the first complaint threshold 410 but not the second complaint threshold 412. In this regard, a first level of costs may be billed to the sender corresponding to the complaint messages in excess of the first complaint threshold 410.

Briefly referring to time interval number 3, the complaints received 406 exceed the second complaint threshold 412. Some embodiments provide that a second level of costs may be billed to the sender corresponding to the complaint messages in excess of the second complaint threshold. In some embodiments the second level of costs may be significantly greater than the first level of costs in order to incentivize the sender to avoid sending unwanted communications. Some embodiments provide that the first and second levels of costs are fixed value costs corresponding to exceeding the first and second complaint thresholds, 410, 412 respectively. Some embodiments provide that the first and second levels of costs are per complaint costs are assessed for each complaint that exceeds the respective thresholds.

System Embodiments

Figure 8:
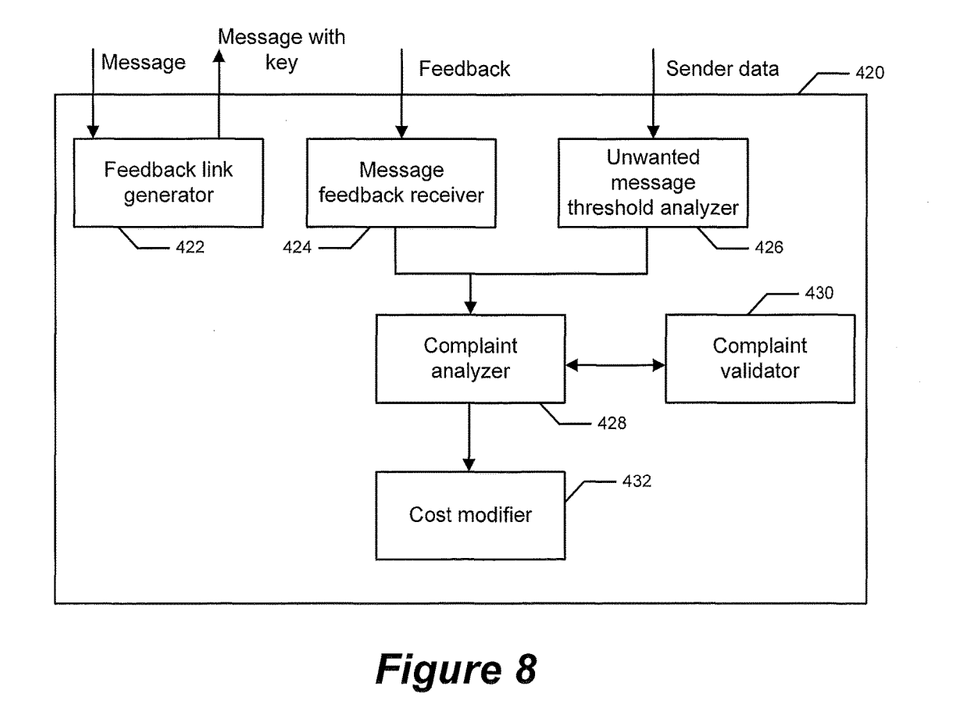
FIG. 8 is a block diagram of a system for influencing communication content, according to various embodiments described herein.

Reference is now made to FIG. 8, which is a block diagram of a system for influencing communication content, according to various embodiments described herein. The system may include a feedback link generator 422 that is configured to receive a message from a sender and generate a feedback link corresponding to the sender and the recipient and to insert the feedback link into the message before the message is sent to recipients. For example, the feedback link may include an identifier that includes an encoded key value that is generated by feedback link generator 422 after the message is received from the sender and inserted into the message before the message is sent by the system 420. In some embodiments, the feedback link, when executed, causes the feedback data to be transmitted to a message feedback receiver 424, which may receive feedback data that corresponds to an unwanted message that was sent by the system. The message may be identified as unwanted by a recipient thereof.

An unwanted message threshold analyzer 426 may be configured to analyze sender data and determine a complaint threshold corresponding to unwanted messages provided by the sender. In some embodiments, the unwanted message threshold analyzer 426 may determine the complaint threshold as a function of a total volume of messages sent by the sender in a given time interval. For example, the complaint threshold may include a percentage value of the total volume of messages sent by the sender in a given time interval. Some embodiments provide that the complaint threshold is inversely related to the total volume of messages sent by the sender in the given time interval. For example, as the total volume of sent messages increases, the unacceptable rate of complaint messages may decrease. In some embodiments, the complaint threshold includes multiple complaint thresholds corresponding to different quantities and/or rates of unwanted messages.

A complaint validator 430 may evaluate the feedback data that corresponds to the unwanted message to determine legitimacy of a complaint. If the complaint is determined to be legitimate, a complaint analyzer 428 may be configured to analyze the feedback data received by the message feedback receiver 424 relative to the complaint threshold determined by the unwanted message threshold analyzer 426. In the circumstance of multiple complaint thresholds, the complaint analyzer 428 may analyze the feedback data that corresponds to the unwanted message relative to the complaint thresholds to determine which of the complaint thresholds was exceeded.

A cost modifier 432 may modify a cost that is assessed to the sender responsive to the complaint analyzer 428 generated sender unwanted message data. The cost modifier 432 may include a discount to the sender if the unwanted message data indicates that a quantity of unwanted messages is below the complaint threshold for a given number of predefined time intervals. Some embodiments provide that the cost modifier 432 may include an additional fee to be billed to the sender corresponding to unwanted message data that exceeds the complaint threshold. In the circumstance of multiple complaint thresholds, the cost modifier 432 is further configured to determine the additional fee responsive to which of the complaint thresholds was exceeded.

Although as described above, the system 420 may include an email sending system, the system is not so limited. For example some embodiments provide that the system 420 is a social network that provides point to point communications between network participants. In this regard, the cost modifier may be configured to increase the cost of the sender participating in the social network in response to unwanted message data that corresponds to the sender. In some embodiments, a service modifier may be included that may modify access to social network services responsive to unwanted message data that corresponds to the sender. Modifying the access to social network services is but one example of a non-monetary cost that may be imposed on a sender that exceeds a complaint threshold in a network. Other examples of non-monetary costs that may be assessed on a sender include bandwidth limits, transfer rate limits, storage size limits, and/or message quantity limits, among others.

Other Email Embodiments

Figure 9:
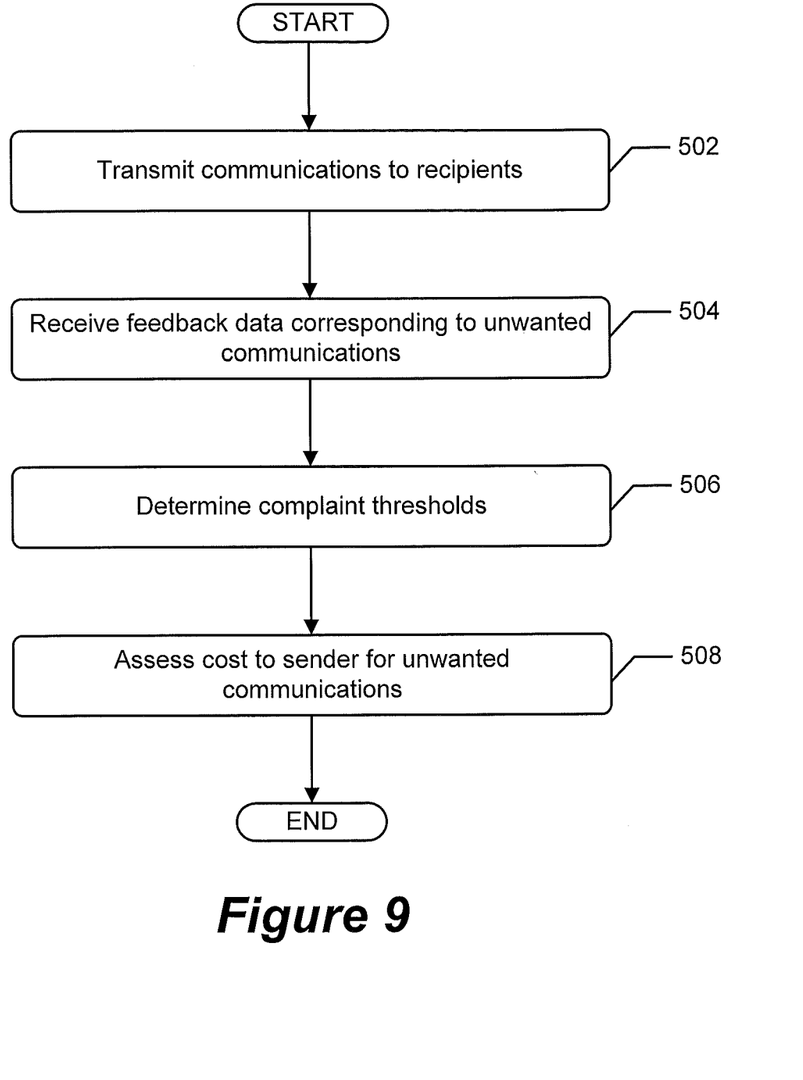
FIG. 9 is a flowchart of operations that may be performed to incentivize a sender by assessing a content-related cost regarding unwanted communications according to some embodiments described herein.

Reference is now made to FIG. 9, which is a flowchart of operations that may be performed to incentivize a sender by assessing a content-related cost regarding unwanted communications according to some embodiments described herein. Operations may include transmitting multiple electronic communications such as emails to multiple email recipients on behalf of a sender (block 502). Some embodiments provide that the emails may be transmitted to a service provider that delivers the emails to the email recipients. In some embodiments, the emails may be transmitted to the recipients in the absence of a service provider.

Feedback data corresponding to recipient receptiveness of the emails may be received (block 504), In some embodiments, the feedback data may identify the emails that email recipients have identified as unwanted. For example, email recipients may execute a spam button or link to identify the an email as unwanted. In the circumstance where the email was delivered through service provider, the feedback data may include a redacted portion of the unwanted email message that is sent from the service provider in response the email being identified as unwanted.

A complaint threshold corresponding to an unacceptable quantity of unwanted emails may be determined (block 506). Some embodiments provide that the complaint threshold may be determined as a percentage of a total volume of emails that are sent during a given time interval. For example, for a high volume sender, a complaint threshold may be one percent of the total volume of emails sent during a time interval. In some embodiments, the time interval may be defined in terms of hours, however, the disclosure is not so limited.

Some embodiments provide that the complaint threshold includes multiple ranges of quantities of unwanted emails. For example, a first range may be less that ten emails and a second range may be between ten and twenty emails. Another example provides that the ranges are defined in terms of percentages of total volume. For example, a first range may include one percent or less while a second range may include greater than one percent but less than five percent. Such ranges and values are provided by way of example and thus are non-limiting.

In response to emails that are identified as unwanted, a cost corresponding to unwanted emails that exceed the complaint threshold may be assessed to the sender (block 508). In some embodiments, assessing the cost to the sender includes assessing different costs corresponding to different ranges defined in by the complaint threshold. In this regard, as the quantities of unwanted emails increases, a corresponding cost may increase.

Various embodiments have been described fully herein with reference to the accompanying figures, in which various embodiments are shown. This disclosure may, however, be embodied in many alternate forms and should not be construed as limited to the embodiments set forth herein.

Accordingly, while the disclosure is susceptible to various modifications and alternative forms, specific embodiments thereof are shown by way of example in the drawings and were described in detail herein. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluеRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the disclosure being set forth in the following claims.

Therefore, at least the following is claimed:

1. A method, comprising:
   receiving, by at least one of one or more computing devices over a period of time, feedback data associated with at least one of a plurality of emails transmitted on behalf of a sender to a plurality of email recipients, the feedback data indicating that the at least one of the plurality of emails are unwanted;
   updating, by at least one of the one or more computing devices, a history of complaint data associated with the sender based at least in part on the feedback data;
   determining, by at least one of the one or more computing devices, a first complaint threshold for a first time interval over the period of time and a second complaint threshold for a second time interval over the period of time; and
   assessing a cost to the sender based at least in part on (i) a first comparison of a current quantity of complaints with a current complaint threshold and (ii) a second comparison of a weighted moving average of the history of complaint data over the first time interval and the second time interval with at least one of the first complaint threshold or the second complaint threshold, the weighted moving average being based at least in part on a complaint rate during the period of time the first time interval and the second time interval.

2. The method according to claim 1, wherein assessing the cost to the sender comprises:
   assessing, by at least one of the one or more computing devices, a first cost to the sender in response to a comparison of the weighted moving average to the first complaint threshold; and
   assessing, by at least one of the one or more computing devices, a second cost to the sender in response to a comparison of the weighted moving average to the second complaint threshold.

3. The method according to claim 1, wherein determining the first complaint threshold comprises determining, by at least one of the one or more computing devices, the first complaint threshold for the first time interval based at least in part on a volume of the plurality of emails sent during the first time interval.

4. The method according to claim 1, wherein determining the second complaint threshold comprises determining, by at least one of the one or more computing devices, the second complaint threshold for the second time interval based at least in part on a volume of the plurality of emails sent during the second time interval.

5. The method according to claim 1, further comprising adjusting, by at least one of the one or more computing devices, at least one of the first complaint threshold or the second complaint threshold according to a function of a volume of the plurality of emails sent.

6. The method according to claim 1, further comprising adjusting, by at least one of the one or more computing devices, at least one of the second complain threshold for the first time interval or the second complaint threshold for the second time interval according to a function of a volume of the plurality of emails sent.

7. The method according to claim 1, further comprising discounting the cost to the sender in response to a determination that the weighted moving average does not exceed at least one of first complaint threshold or the second complaint threshold.

8. The method according to claim 1, further comprising discounting the cost to the sender in response to a determination that the weighted moving average does not exceed the first complaint threshold or the second complaint threshold over the period of time.

9. A system, comprising:
   at least one memory to store computer-readable instructions; and
   at least one of one or more processing devices coupled to the memory and configured, through execution of the computer-readable instructions, to:
   receive feedback data over a period of time that corresponds to a message identified by a recipient as an unwanted message from a sender;
   update a history of complaint data associated with the sender based at least in part on the feedback data;
   determine a first complaint threshold for a first time interval over the period of time and a second complaint threshold for a second time interval over the period of time; and
   assess a cost to the sender based at least in part on (i) a first comparison of a current quantity of complaints with a current complaint threshold and (ii) a second comparison of a weighted moving average of the history of complaint data over the first time interval and the second time interval with at least one of the first complaint threshold or the second complaint threshold, the weighted moving average being based at least in part on a complaint rate during period of time the first time interval and the second time interval.

10. The system according to claim 9, wherein at least one of the one or more processing devices is further configured to discount the cost to the sender in response to a determination that the weighted moving average does not exceed at least one of first complaint threshold or the second complaint threshold.

11. The system according to claim 9, wherein at least one of the one or more processing devices is further configured to assess an additional fee to the sender in response to a determination that the weighted moving average exceeds both the first complaint threshold and the second complaint threshold.

12. The system according to claim 9, wherein at least one of the one or more processing devices is further configured to determine at least one of the first complaint threshold or the second complaint threshold based at least in part on a volume of a plurality of emails sent.

13. The system according to claim 9, wherein at least one of the one or more processing devices is further configured to adjust at least one of the first complaint threshold or the second complaint threshold according to a function of a volume of a plurality of emails sent.

14. The system according to claim 9, wherein at least one of the one or more processing devices is further configured to:
determine a second complaint threshold for the first time interval and a second complaint threshold for the second time interval; and
assess a second cost to the sender based at least in part on the weighted moving average of the history of complaint data as compared to at least one of the second complaint threshold for the first time interval or the second complaint threshold for the second time interval.

15. A non-transitory computer-readable medium storing computer-readable instructions thereon that, when executed by at least one of one or more computing devices, directs at least one of the one or more computing devices to perform a method, comprising:
analyzing, by at least one of the one or more computing devices, feedback data associated with an email message provided to an email service by a sender, the feedback data provided by a recipient of the email message and associated with the sender;
updating, by at least one of the one or more computing devices, a history of complaint data associated with the sender based at least in part on the feedback data;
determining, by at least one of the one or more computing devices, a first complaint threshold for a first time interval and a second complaint threshold for a second time interval; and
adjusting a fee for the sender to use the email service based at least in part on (i) a first comparison of a current quantity of complaints with a current complaint threshold and (ii) a second comparison of a weighted moving average of the history of complaint data over the first time interval and the second time interval with at least one of the first complaint threshold or the second complaint threshold, the weighted moving average being based at least in part on a complaint rate over a period of time the first time interval and the second time interval.

16. The non-transitory computer-readable medium according to claim 15, the method further comprising:
identifying a portion of the email message as an unwanted message;
attributing the unwanted message to an account associated with the sender; and
increasing the fee for the sender to use the email service based at least in part on the unwanted message.

17. The non-transitory computer-readable medium according to claim 15, the method further comprising:
adjusting, by at least one of the one or more computing devices, a first fee to the sender in response to a comparison of the weighted moving average to the first complaint threshold; and
adjusting, by at least one of the one or more computing devices, a second fee to the sender in response to a comparison of the weighted moving average to the second complaint threshold.

18. The non-transitory computer-readable medium according to claim 15, the method further comprising adjusting, by at least one of the one or more computing devices, at least one of the first complaint threshold or the second complaint threshold according to a function of a volume of a plurality of emails sent.

* * * * *